June 30, 1970 W. K. BENDER 3,517,991

CARTRIDGE FOR STORING VISUAL AND AUDIO INFORMATION

Filed Sept. 5, 1961 3 Sheets-Sheet 1

INVENTOR.
WERNER K. BENDER

BY Kane and Nydick

ATTORNEYS

CARTRIDGE-FOR STORING VISUAL AND AUDIO INFORMATION

Filed Sept. 5, 1961 3 Sheets-Sheet 2

INVENTOR.
WERNER K. BENDER
BY Hane and Nydick
ATTORNEYS

CARTRIDGE FOR STORING VISUAL AND AUDIO INFORMATION

Filed Sept. 5, 1961

INVENTOR.
WERNER K. BENDER
BY Hane and Nydick
ATTORNEYS 3,517,991
Patented June 30, 1970

1

3,517,991

CARTRIDGE FOR STORING VISUAL AND AUDIO INFORMATION

Werner K. Bender, Hartford County, Conn., assignor to The Kalart Company Inc., Plainville, Conn., a corporation of New York Filed Sept. 5, 1961, Ser. No. 135,923
Int. Cl. G03b *31/06*
U.S. Cl. 353—19 15 Claims

ABSTRACT OF THE DISCLOSURE

A sound-slide holder cartridge containing a transparency and supply reel and a take-up reel for magnetic recording tape. Insertion of the cartridge into a projector presses an exposed portion of the tape against a sound head and a capstan. A spring motor mounted on the supply reel maintains constant torque on both reels and causes rewinding of the tape when the cartridge is withdrawn from the capstan.

The present invention relates to magazines or cartridges containing visual and audio information and adapted to be inserted for projection and sound reproduction, respectively, in suitable projecting and sound-reproducing apparatus, and more particularly to a magazine or cartridge in which the visual information is contained in the form of a photographic transparency and the audio information is recorded on magnetic tape. The visual and audio information associated in the cartridge may constitute a program or presentation in which the audio information explains or supplements the visual information.

In cartridges for magnetic tape as known, the tape is wound by means of a capstan drive from a supply reel upon a take-up reel, and while being so wound it is guided past a reproducing magnetic sound head. Obviously, upon completion of the reproduction, the tape must be wound back from the take-up reel upon the supply reel to ready the tape for a repetition of the presentation.

It is a broad object of the present invention to provide a novel and improved cartridge of the general kind hereinbefore referred to, in which the tape is automatically rewound upon completion of the reproduction of sound, and in which the rewinding is effected irrespective of whether the cartridge is left in the apparatus or removed therefrom.

A more specific object of the invention is to provide a novel and improved cartridge of the kind above referred to which is capable of accommodating a tape containing a considerably more lengthy message than heretofore was possible for a given size of cartridge, such increase in the length of the message being achieved without increasing the space required by the cartridge in the apparatus. The tape which can be accommodated in a cartridge according to the invention is capable of reproducing a message of about 60 seconds, although of course the message may be of shorter duration.

Another more specific object of the invention is to provide a novel and improved cartridge the rewinding mechanism of which is automatically activated upon removal of the cartridge from the sound projector.

Still another more specific object of the invention is to provide a novel and improved cartridge the supply reel and take-up reel of which are superimposed within the cartridge, whereby the cartridge attains a compact over-all design permitting the storage of a considerable length of tape within a comparatively small cartridge casing.

2

A further more specific object of the invention is to provide a novel and improved cartridge in the form of a flat, generally rectangular casing in which are accommodated a photographic transparency or a holder therefor and the reels with the rewind mechanism coupled thereto, and which is receivable by a sound projector in a position such that a transparency in the cartridge is correctly located for projection and the sound tape for scanning by the sound head of the apparatus, manual or automatic removal of the cartridge from the apparatus at the end of a presentation activating the rewind mechanism.

Cartridges according to the invention may of course also be advantageously used for recording the information on the tape stored in the cartridge.

A still further object of the invention, allied with the preceding ones, is to provide a novel and improved time-setting mechanism for a cartridge according to the invention and containing visual and audio information, which mechanism, upon the expiration of an adjustably preset period of time, ejects the cartridge or causes ejection of the cartridge from the apparatus, whereby the rewind mechanism of the cartridge is activated.

Other and further objects, features and advantages of the invention will be pointed out hereinafter and set forth in the appended claims constituting part of this application.

In the accompanying drawing several preferred embodiments of the invention are shown by way of illustration, and not by way of limitation.

Figures 1, 3:
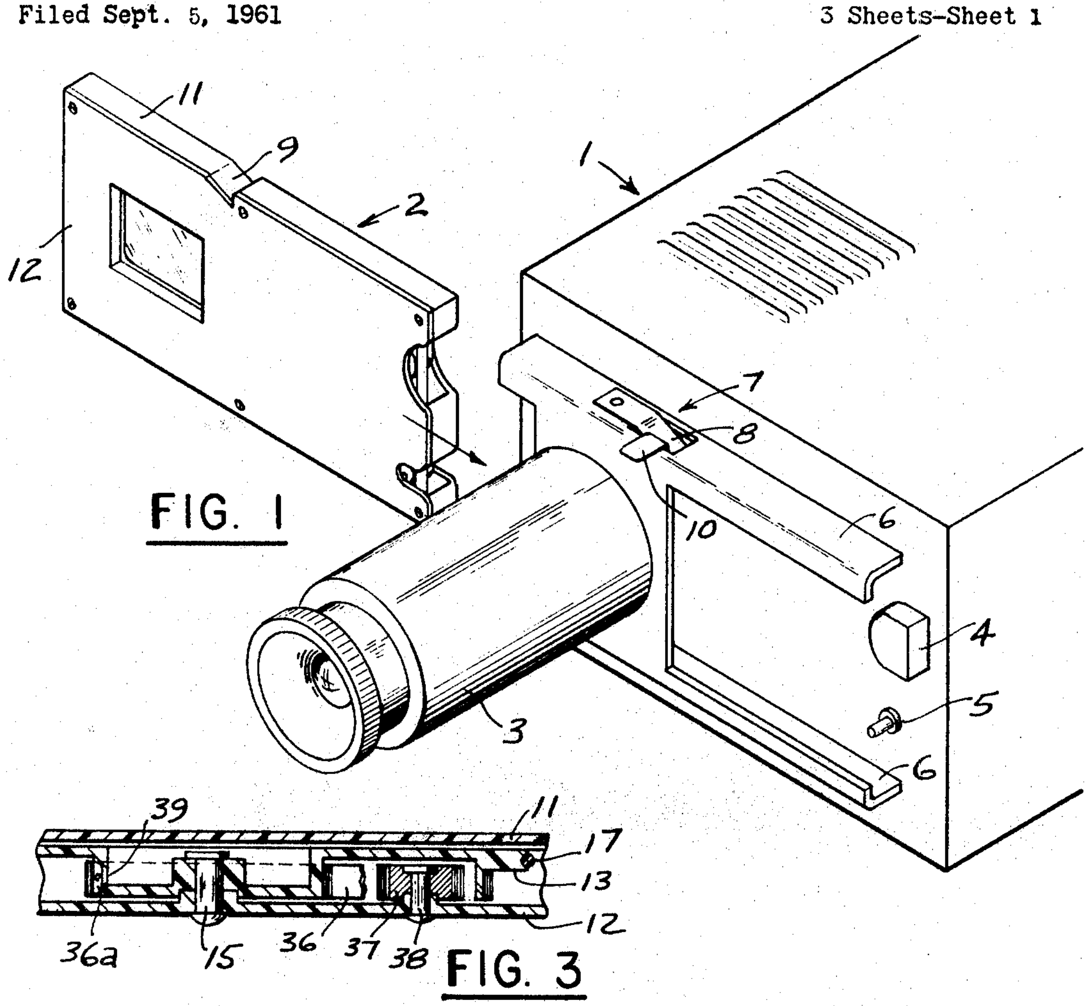
FIG. 1 is a perspective view of a cartridge and of a sound projector in which the cartridge may be used.
FIG. 3 is a section taken on line 3—3 in FIG. 2 on an enlarged scale.

Referring now to the figures in detail, FIG. 1 shows a sound projector 1 and a cartridge or magazine 2. Projector 1 as such does not constitute part of the invention, and should be visualized as being of conventional design. Accordingly, the projector includes a light source (not shown) and an optical system, indicated by lens turret 3, for projecting a photographic transparency positioned in the cartridge. The sound-reproducing equipment of the projector includes the usual amplifying and loud-speaking means, a magnetic sound head 4, and a capstan 5 driven by a suitable motor (not shown) within the projector and driving the magnetic tape during reproduction therefrom. The front wall of the projector mounts guide tracks 6 for slidably receiving and locating cartridge 2. Catch means 7 on the guide tracks serves to retain the cartridge in a position in which the magnetic tape therein is in coacting relationship with sound head 4 and capstan 5, as will be more fully explained hereinafter. Catch means 7 is shown as comprising a springy tongue 8 biased to engage a notch 9 when the cartridge is pushed home in the projector. Tongue 8 may be lifted out of the notch by means of a grip 10.

Figure 2:
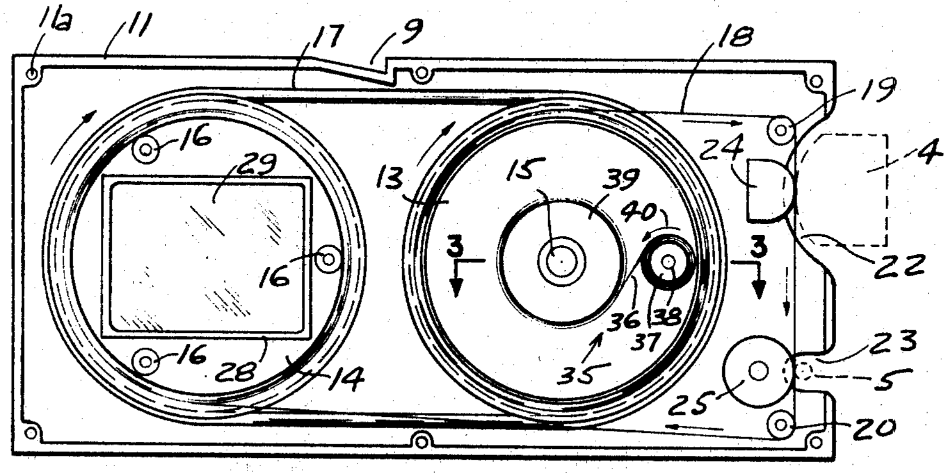
FIG. 2 is a plan view of the cartridge, the cover of the cartridge being removed.

The cartridge comprises a casing 11 of generally rectangular shape, normally closed by a cover 12, which is removed in FIG. 2, and which may be secured to the casing by means of screws inserted in screw holes **11*a*. The casing houses a supply reel 13 and a take-up reel 14. Reel 13 is rotatable about a shaft 15, and reel 14 is guided by rollers 16 rotatable about an axis parallel to shaft 15. The two reels are coupled and joined for synchronous and equal rotation by transmission means, such as a belt 17. The magnetic tape 18 is initially wound upon reel 13 and is guided by idlers 19 and 20 to take-up reel 14. As is evident, rotation of reel 13 in a clockwise direction will wind the tape from reel 13 upon reel 14, and rotation of reel 13 in a counterclockwise direction will rewind the tape from reel 14 upon reel 13. The right-hand end wall of casing 2 is formed with apertures 22 and 23 to expose portions of the tape traveling from the supply reel to the take-up reel, and more specifically between the idlers 19 and 20, for coaction with sound head 4 and capstan 5, respectively. To maintain the tape in good sound-transmitting contact with sound head 4, a cushion 24 made of felt or similar soft material and an idler 25 serve to press the tape against sound head 4 and capstan 5**, respectively.

The space defined by ring-shaped reel 14 is utilized to accommodate a frame 28 for the insertion of a photographic transparency 29. As is apparent, a transparency and a magnetic tape may be readily inserted in the casing or removed therefrom when cover 12 is detached from the cartridge casing, as is shown in FIG. 2.

Assuming that the cartridge as described so far is inserted in the projector and pushed home, that is, into a position in which the tape is held between sound head 4 and cushion 24 and also between capstan 5 and idler 25, and further assuming that the projector is switched on, transparency 29 will be projected upon a suitable screen, and information recorded on tape 18 will be reproduced while the tape is gradually wound from reel 13 upon reel 14.

In order to rewind the tape from the take-up reel upon the supply reel and to effect such rewinding automatically when the tape is freed from coaction with the sound head and the capstan by releasing catch 7, a spring motor 35 is coupled with one of the reels, and more specifically with reel 13. The spring motor is shown as comprising a flat spring 36, one end portion of which is coiled upon a roller 37 freely rotatable on a shaft 38, which in turn is mounted in cover 12 of casing 11, as can best be seen in FIG. 3. The other end portion of the coil is wound upon a drum 39 secured to or integral with reel 13 for coaxial rotation in unison with the reel. The end of coil 36 wound upon drum 39 is secured to the drum at **36*a*. The spring portion joining the two coiled spring portions is substantially straight, as can be seen in FIG. 2. The spring is so biased that it tends to coil itself upon roller 37 and that it is substantially relaxed when the tape is wound upon supply reel 13; that is, when the tape is in condition for a reproduction of the complete message recorded thereon. In other words, a maximum of spring 36 is coiled upon roller 37 when the tape is wound upon supply reel 13. When reel 13 is now rotated in a clockwise direction by the action of capstan 5, as previously described, thereby winding the tape gradually from reel 13 upon reel 14, the spring is also gradually wound from roller 37 upon drum 39, thereby gradually storing energy in the spring and thus loading the spring motor. The length of spring 36 is so selected that the spring motor is substantially fully or at least adequately loaded when the transfer of the tape from reel 13 to reel 14** is completed.

As the spring motor is being loaded, it generates a force tending to rewind the spring from drum 39 upon roller 37 and accordingly to rotate reel 13 in a counterclockwise direction, as is indicated by arrow 40. This turning force is overcome by the driving force applied by capstan 5 to tape 18. However, as soon as the tape is freed from the capstan, the now released force of the spring motor will turn reel 13 in a counterclockwise direction. The rotation of the reel 13 is transmitted by belt 17 to reel 14, and accordingly the tape will be rewound from reel 13 upon reel 14. The loading of the spring motor is selected so that spring 36 is again relaxed when the rewinding of the tape is completed.

The spring assembly as hereinbefore described has a constant force while being wound from roller 37 upon drum 39, and also provides a constant torque at the supply reel, and therefore a constant load at the capstan and a constant rate of speed of the tape while the tape is moving past the sound head. Constant-torque spring motors of this kind are well known in the art and available in the market.

Both reels are rotated at synchronous and equal speed in either direction. Theoretically, the relative rate of speed of the two reels should be changed as the tape turns diminish on one reel and increase on the other reel. However, the changes in diameter are so slight that the tape will be smoothly wound and unwound, even though the two reels are directly coupled by belt 17. A sound message of about 60 seconds' duration, recorded at a speed of 1 inch per second, requires a tape of about 60 inches. For a supply reel having a diameter of 2 inches, 60 inches of tape will be ten turns of tape. The standard acetate tape has a thickness of 0.0015 inch, and hence ten turns will increase the diameter of the reel from 2.000 inches to only 2.030 inches. The tape length on the first turn, compared with the tape length on the tenth turn, is about 6.28 inches as against 6.38 inches. Such small differences can be safely neglected.

Figure 4:
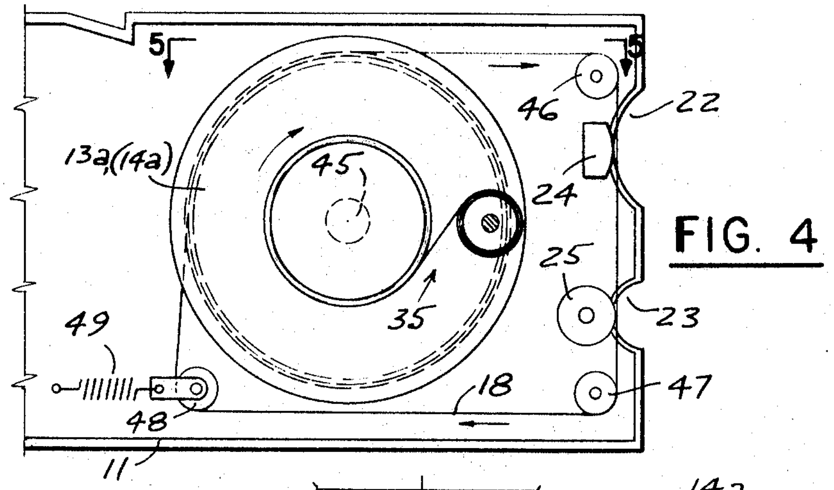
FIG. 4 is a fragmentary plan view of a modification of the cartridge.
Figure 5:
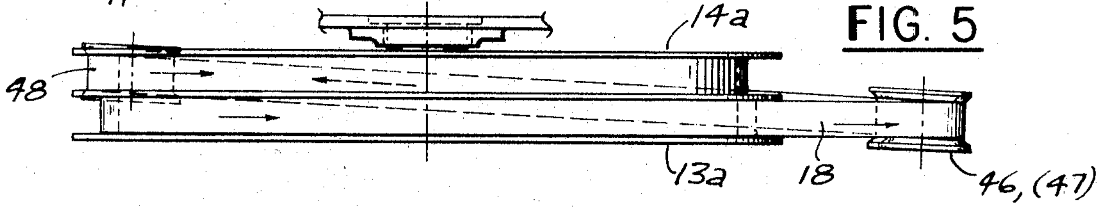
FIG. 5 is a sectional view on line 5—5 in FIG. 4 on an enlarged scale in the first angle projection.

FIGS. 4 and 5 show a cartridge in which the co-planar arrangement of FIG. 2 is replaced by a superimposed reel arrangement. The frame 28 for transparency 29 should be visualized as being located to the left of the reels as shown in FIG. 4. The cartridge of FIGS. 4 and 5 again comprises a casing 11 in which a supply reel **13*a* and a take-up reel 14*a* are rotatably mounted about a common shaft 45, so that the two reels in effect constitute a drum. Tape 18 is initially wound upon supply reel 13*a* and guided by idlers 46, 47 and 48 past apertures 22 and 23 for coaction with the sound head and the capstan, respectively (not shown in FIG. 4), and to take-up reel 14*a*, which is shown as the upper reel in the plan view of FIG. 4. Idler 48 is preferably tensioned by means of a spring 49 secured at one end to casing 11. Spring motor 35** in the embodiment of FIGS. 4 and 5 is mounted on the supply reel side of the drum formed by the two reels, but could also be mounted on the opposite side of the drum. Otherwise the cartridge functions in the same manner as has been described in connection with FIGS. 2 and 3. Accordingly, it suffices to state that the spring motor is relaxed when the tape is initially wound upon the supply reel, and is loaded when and while the tape is being transferred from the supply reel to the take-up reel during a reproduction. As soon as the tape is freed from the driving force of the capstan upon completion of a reproduction, it is automatically rewound upon the supply reel by the action of the spring motor, now released.

Figure 6:
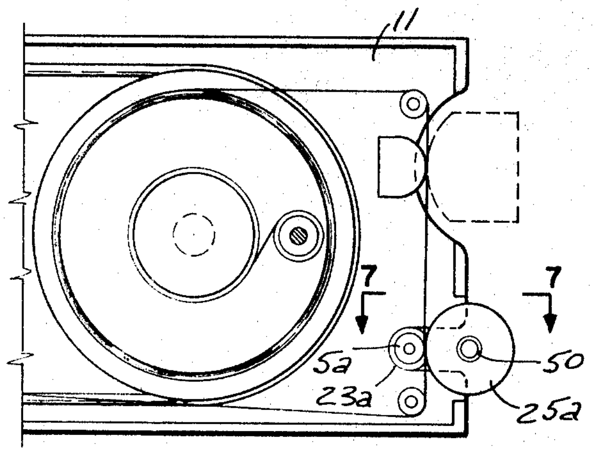
FIG. 6 is a fragmentary view of a modification of the cartridge of the kind shown in FIG. 1.
Figure 7:
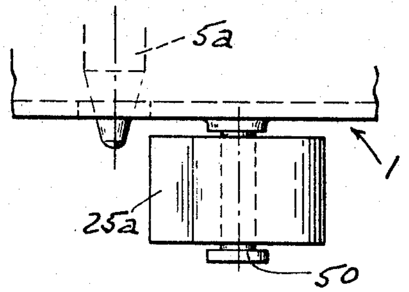
FIG. 7 is a section taken on line 7—7 of FIG. 6, on an enlarged scale, the capstan being shown disengaged from the tape.
Figure 8:
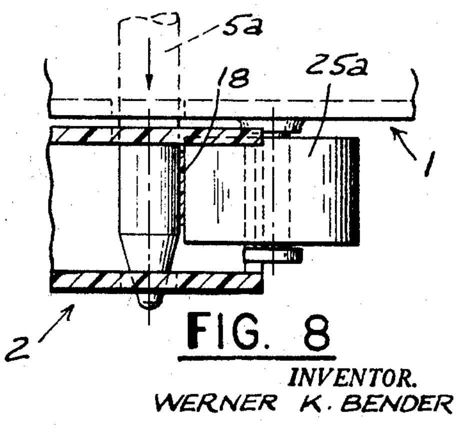
FIG. 8 is a sectional view similar to FIG. 7 but showing the capstan in engagement with the tape.

In the exemplifications heretofore described the tape is freed from the driving force of the capstan by the withdrawal of the cartridge from coaction with the capstan, which remains in position in the projector, and the rotation of which may or may not be discontinued. FIGS. 6, 7 and 8 show an exemplification of the invention in which the capstan is lengthwise withdrawn from coaction with the tape. According to FIGS. 6, 7 and 8, an idler **25*a* is rotatably mounted on projector 1 by means of a pin 50, and the capstan 5a is disposed slidable lengthwise in the projector casing. The capstan can be lowered from the withdrawn position of FIG. 7 into the driving position of FIG. 8, in which tape 18 is drivingly held between the capstan and idler 25a. The casing 11 of the cartridge is provided with an aperture 23a** for receiving the capstan in its lowered or driving position.

The functioning of the arrangement according to FIG. 6 is apparent from the description of FIG. 2. It should be mentioned that the capstan mounting according to FIGS. 6, 7 and 8 may also be used in connection with the cartridge arrangement of FIGS. 4 and 5.

Figure 9:
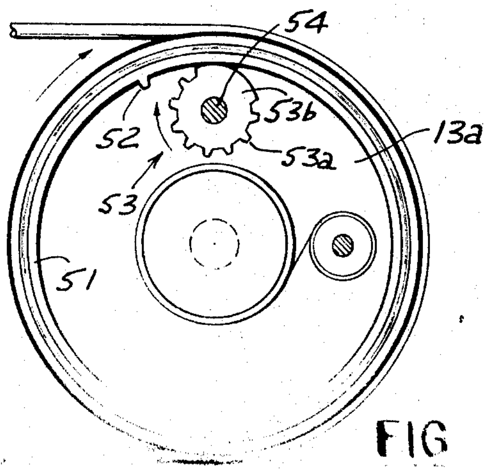
FIG. 9 is a fragmentary plan view of a modification of the supply reel.
Figure 10:
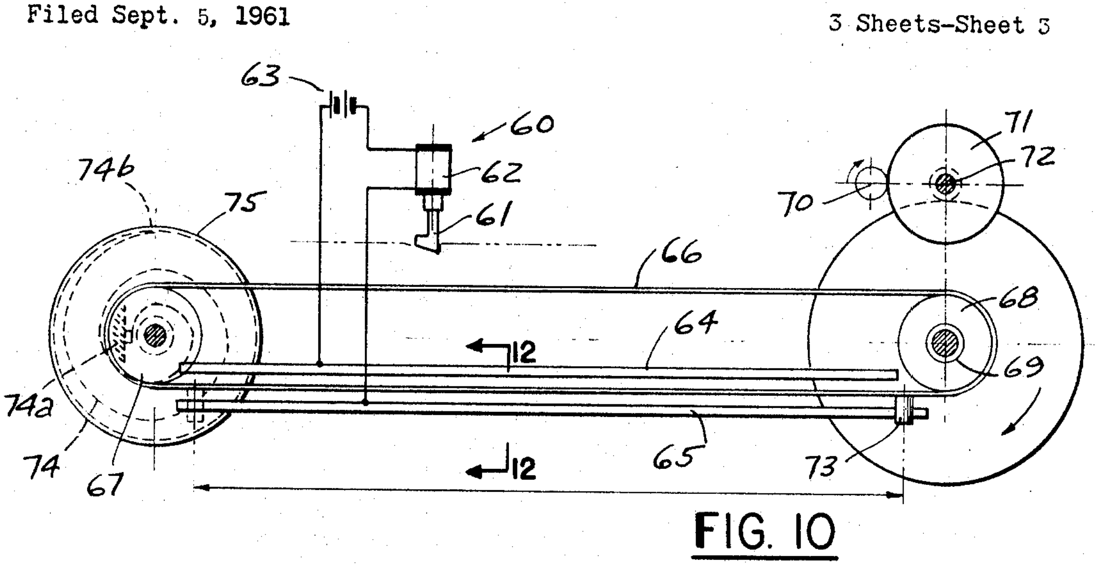
FIG. 10 is a diagrammatic elevational view of a time-setting assembly for controlling the time of reproduction.

FIG. 9 shows an arrangement which positively limits the revolutions of the supply reel while the tape is transferred from the supply reel to the take-up reel, to prevent the tape being pulled off the supply reel. The limiting means comprises a peripheral flange 51 on reel 13 or a separate disk jointly rotatable with reel 13. Flange 51 is formed at its inner periphery with a tooth 52 coacting with a toothed wheel 53. Wheel 53 is freely rotatable on a pin 54 mounted in a casing wall similarly to shaft 38, so that pin 54 is stationary with reference to a rotation of reel 13a and tooth 52. Wheel 53 has a plurality of teeth 53a and a peripheral solid portion 53b. Tooth 52 engages one of the teeth of wheel 53 during each revolution of reel 13a, thereby turning wheel 53 through a corresponding angle. After a number of revolutions of reel 13a, determined by the number of teeth on wheel 53, tooth 52 engages the solid peripheral portion of wheel 53, thereby blocking further rotation of reel 13a. In the assembly previously mentioned, ten turns of reel 13 were assumed. Accordingly, the number of teeth on wheel 53 is so selected that reel 13a is blocked after ten revolutions. When reel 13a is rotated in the opposite direction for rewinding the tape from reel 14a upon reel 13a, tooth 52 rotates wheel 53 also in the opposite direction, tooth by tooth, so that wheel 53 is returned to the position for a reproduction from the tape.

Release of catch means 7 (FIG. 1) or displacement of the capstan (FIGS. 6, 7 and 8) may be effected manually or by suitable mechanically or electromagnetically actuated means. Actuating means for that purpose are readily apparent. It is also possible, and sometimes advantageous, to initiate the rewinding of the tape from the take-up reel to the supply reel by mechanically or electrically operated time-setting means. For instance, it may be desirable or sufficient to reproduce only part of an audio message associated in the cartridge with a visual message, or it may be desirable to have the cartridge automatically ejected at the end of a reproduction, for example, in connection with an automatic cartridge-changing apparatus.

Figure 11:
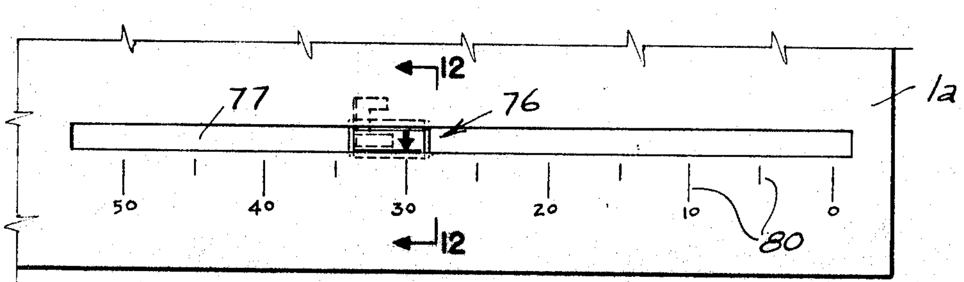
FIG. 11 is an elevational front view of part of the time-setting assembly.
Figure 12:
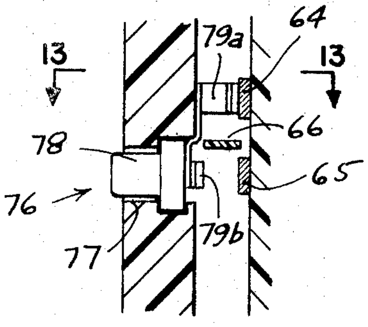
FIG. 12 is a section taken on line 12—12 in FIGS. 10 and 11, on an enlarged scale.

FIGS. 10 through 14 show adjustable time-setting means for ejecting a cartridge at the end of a preset period of time. The ejection means 60 may simply release catch means such as are shown in FIG. 1, or they may effect a positive ejection of the cartridge, or initiate removal of one cartridge and insertion of the next cartridge. They are diagrammatically shown as a latching hook 61 operable by the state of energization of a solenoid 62. The solenoid is controlled by an energizing circuit including a battery 63, by way of example, and connected to conductive bars 64 and 65. A belt 66, such as a rubber belt, is driven between the two bars parallel thereto and is mounted for the purpose on two pulleys 67 and 68. Pulley 68 is seated on a shaft 69, which is driven from a shaft 70 through a gear train 71–72 at a suitable rate of speed. A contact block 73 is suspended from belt 66 and slidably guided on lower bar 65. Rotation of the gear train in the direction indicated by arrows gradually drives the block from its right-hand full-line limit position to its left-hand dotted-line limit position. While the block is being so driven, a soft spring 74, secured at its inner end 74a at a stationary point and at its outer end 74b to a drum 75 rotatably jointly with pulley 67, is gradually loaded. When the drive of belt 66 is arrested, spring 74 unwinds and returns block 73 from its left-hand limit position into its right-hand limit position. Contact block 73 is used to control the energizing circuit of the solenoid and coacts for that purpose with an adjustable switch assembly 76. The bars, the contact block and the driving assembly for the contact block are mounted behind one of the walls of the casing of the projector, or within a separate control box. FIG. 11 shows the assembly mounted behind the front wall 1a of the projector. The wall includes a slot 77 in which the switch assembly is slidably mounted. The switch assembly comprises a guide member 78, which protrudes from the outside of the wall to permit displacement of the switch assembly within slot 77, and a pair of contact springs 79a and 79b. Both springs are mounted on guide member 78 and are electrically connected. Spring 79a is in continuous contact engagement with upper bar 64.

Figure 13:
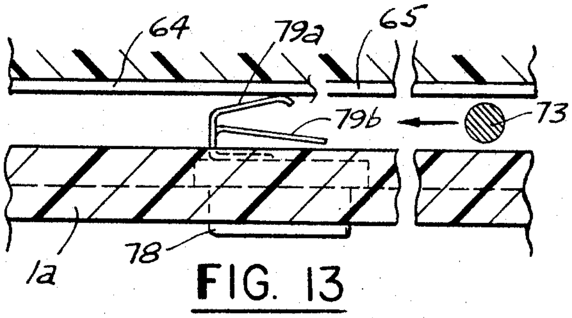
FIG. 13 is a section taken on line 13—13 of FIG. 12.
Figure 14:
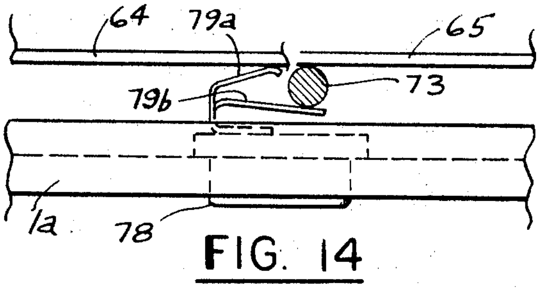
FIG. 14 is a section similar to FIG. 13, but showing a different stage of the operation.

FIG. 13 shows the travel of block 73 toward the contact springs, and FIG. 14 shows engagement between block 73 and contact spring 79b. Since, as previously mentioned, block 73 is slidable on bar 65 and hence in electrical contact with that bar, engagement of block 73 with spring 79b closes the energizing circuit for solenoid 62 through the contact springs 79a and 79b and the bars. As a result, the latch hook is actuated. A calibration 80, in seconds of time, for instance, is provided along slot 77, so that by setting the switch assembly 76 for any selected period of time, the cartridge is automatically tripped as soon as block 73 reaches the switch. A setting for a 30 second trip time is shown in FIG. 11.

Although the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A self-contained cartridge for magnetic recording tape, said cartridge comprising a casing, a tape supply reel and a tape take-up reel for respectively winding and unwinding magnetic tape thereupon, said reels being rotatable in said casing independent of each other, said casing having apertures for exposing portions of the tape extending between the two reels for cooperation with a capstan to effect driving of the tape from the supply reel to the take-up reel and for coaction of the tape with a sound head, guide means for guiding the tape from one reel to the other past said apertures, and a constant torque spring motor mounted on said supply reel for maintaining a substantially constant torque on both said reels for any state of loading of the motor, said motor including a first roller mounted coaxially with said supply reel for rotation in unison therewith, a second roller mounted in said casing freely rotatable about an axis spaced apart from but parallel to the rotational axis of said roller, and a band spring having one end portion secured to the first roller and the other to the second roller, a straight portion of the spring extending between the two rollers, said spring being biased to coil itself upon the second roller and being loaded by coiling the spring upon the first roller when the tape is driven by the capstan, release of the tape from the capstan causing rewinding of the tape upon the supply reel by the action of the spring recoiling itself upon the second roller.

2. A cartridge according to claim 1 and comprising releasable catch means on the casing for releasably retaining the casing on an apparatus having a magnetic sound head and a capstan in position in which tape portions exposed in said apertures are in operational relationship with said sound head and said capstan.

3. A cartridge according to claim 1, wherein said casing includes in wall portions transverse of the rotational axes of the reels a window for exposing a photographic transparency placed therein, said window being located in transverse alignment with the peripheral outline of one of said reels.

4. A cartridge according to claim 3, wherein said reels are disposed in the casing in coplanar relationship, said window being within the peripheral outline of the take-up reel, and wherein said take-up reel is ring shaped and guide rollers engage the inner peripheral wall of the take-up reel to guide the same for rotation about an axis parallel to the axis of the supply reel.

5. A cartridge according to claim 1 and comprising transmission means coupling said reels for synchronously and uniformly rotating the same by the action of the capstan upon the tape and the action of the spring motor upon the supply reel respectively.

6. A cartridge according to claim 1, wherein said reels are superimposed in the casing and said casing includes a window for exposing a photographic transparency placed therein.

7. A cartridge according to claim 1 and comprising releasable catch means on the casing for releasably retaining the cartridge on an apparatus having a magnetic sound head and a capstan in a position in which tape portions exposed in said apertures are in operational relationship with said sound head and said capstan, and adjustable time setting means coacting with said catch means for releasing the same after a selected predetermined period of time.

8. A cartridge according to claim 7, wherein said time setting means comprise a movable actuating means engageable with said catch means to release the same upon engagement therewith, and drive means for driving said actuating means at a predetermined rate of speed along a path of adjustable length, the adjusted length of said path controlling said predetermined period of time.

9. A cartridge according to claim 8, wherein the release of said catch means is controlled by the state of energization of a solenoid means, said actuating means controlling an energizing circuit for said solenoid means in a predetermined position of said means along said path.

10. A cartridge according to claim 9, wherein said actuating means comprise two parallel metal bars each connected to a terminal in said energizing circuit, and a contact element driven along said bars at said predetermined rate of speed, said contact element bridging the bars in said predetermined position, thereby closing said energizing circuit.

11. A sound-slide holder comprising:

a first portion for holding a sound tape, and a second portion for holding a transparency, said first portion comprising a compartment for said sound tape, said compartment having a head-receiving recess adapted for cooperation with a magnetic play back head, tape guiding means in said compartment to support and guide said tape in said compartment for transport through said recess, said second portion comprising a window for supporting a film transparency mounted therein, said first and second portions being arranged in circumjacent relation.

12. A sound-slide holder comprising:

a first portion for holding a sound tape, and a second portion for holding a transparency, said first portion comprising a compartment for said sound tape, said compartment having a head-receiving recess adapted for cooperation with a magnetic play back head, tape guiding means in said compartement to support and guide said tape in said compartment for transport through said recess, said second portion comprising a window for supporting a film transparency mounted therein, said first and second portions being arranged respectively in nested outer and inner concentric relation.

13. The sound-slide holder of claim 11 wherein the guiding means includes:

a pressure plate for backing up the sound tape and holding it against a sound head, and means for holding the sound tape against a capstan.

14. The sound-slide holder of claim 11 wherein said compartment includes a removable cover for permitting access to a sound tape in said compartment.

15. The sound-slide holder of claim 11 wherein said second portion further comprises integral retaining means for holding a film transparency mount so that the film transparency will be aligned with said window.

References Cited

UNITED STATES PATENTS

| | | | |
|---|---|---|---|
| 1,221,515 | 4/1917 | Davidson | 88—17 |
| 2,961,922 | 11/1960 | Schwartz et al. | 88—28 |
| 2,971,716 | 2/1961 | Sampson | 242—55 |
| 3,140,360 | 7/1964 | Whitworth | 242—55 |

SAMUEL S. MATTHEWS, Primary Examiner